United States Patent
Zhou et al.

(10) Patent No.: US 11,948,368 B2
(45) Date of Patent: Apr. 2, 2024

(54) REAL-TIME TARGET DETECTION AND 3D LOCALIZATION METHOD BASED ON SINGLE FRAME IMAGE

(71) Applicant: ChongQing University, Chongqing (CN)

(72) Inventors: Xichuan Zhou, Chongqing (CN); Chunqiao Long, Chongqing (CN); Yicong Peng, Chongqing (CN)

(73) Assignee: Chongqing University, Chongging (CN)

( * ) Notice: Subject to any disclaimer, the term of this patent is extended or adjusted under 35 U.S.C. 154(b) by 356 days.

(21) Appl. No.: 17/357,998

(22) Filed: Jun. 25, 2021

(65) Prior Publication Data
US 2022/0083789 A1    Mar. 17, 2022

Related U.S. Application Data

(60) Provisional application No. 63/079,230, filed on Sep. 16, 2020.

(51) Int. Cl.
| | |
|---|---|
| *G06K 9/00* | (2022.01) |
| *G06F 18/22* | (2023.01) |
| *G06K 9/62* | (2022.01) |
| *G06N 3/04* | (2023.01) |
| *G06N 3/045* | (2023.01) |
| *G06N 3/08* | (2023.01) |

(Continued)

(52) U.S. Cl.
CPC ............. *G06V 20/56* (2022.01); *G06F 18/22* (2023.01); *G06N 3/045* (2023.01); *G06N 3/08* (2013.01); *G06T 7/50* (2017.01); *G06T 2207/10024* (2013.01)

(58) Field of Classification Search
CPC . G06V 20/56; G06T 7/50; G06T 2207/10024; G06N 3/045; G06N 3/08
See application file for complete search history.

(56) References Cited

PUBLICATIONS

Chen, Xiaozhi, et al. "Multi-view 3d object detection network for autonomous driving." Proceedings of the IEEE conference on Computer Vision and Pattern Recognition. 2017 (Year: 2017).*

(Continued)

*Primary Examiner* — Bobbak Safaipour
*Assistant Examiner* — Jongbong Nah
(74) *Attorney, Agent, or Firm* — Michael D. Eisenberg

(57) ABSTRACT

The invention relates to a real-time object detection and 3D localization method based on a single frame image. Comprising following steps: S1: inputting a 2D RGB image; S2: performing feature extraction on the 2D RGB image, extracting features of a deep network and a shallow network respectively; S3: carrying out 2D object detection and applying to subsequent modules; S4: estimating vertices, instance-level depth and center point of a 3D-box respectively; S5: adding a regularization term for maintaining horizontal locality into prediction of center point of a 3D-box to constrain and optimize the prediction of center point of the 3D-box; and S6: outputting a 2D RGB image with a 3D-box tag in combination with predictions of all modules. The invention increases the speed of model training convergence and the accuracy of 3D object detection and localization, and meets the accuracy requirements of an Advanced Driver Assistant System (ADAS) with a low hardware cost.

10 Claims, 4 Drawing Sheets

(51) Int. Cl.
    *G06T 7/50*      (2017.01)
    *G06V 20/56*     (2022.01)

(56) References Cited

PUBLICATIONS

Mauri, Antoine, et al. "Deep learning for real-time 3D multi-object detection, localisation, and tracking: Application to smart mobility." Sensors 20.2 (2020): 532 (Year: 2020).*

Simony, Martin, et al. "Complex-yolo: An euler-region-proposal for real-time 3d object detection on point clouds." Proceedings of the European conference on computer vision (ECCV) workshops. 2018 (Year: 2018).*

* cited by examiner

REAL-TIME TARGET DETECTION AND 3D LOCALIZATION METHOD BASED ON SINGLE FRAME IMAGE

CROSS-REFERENCES TO RELATED APPLICATIONS

This application claims priority from U.S. Provisional Application Ser. No. 63/079,230 filed Sep. 16, 2020, which is hereby incorporated herein by reference in its entirety.

TECHNICAL FIELD

The present invention belongs to the technical field of visual processing, and relates to a real-time object detection and 3D localization method based on a single frame image.

BACKGROUND 3D object detection and lozalization based on machine vision is mainly to use sensors to obtain image information or point cloud information, then use a convolutional neural network to extract feature information of a object in an image or point cloud, and process the feature information to return 3D information of the object, i.e., coordinates of center point of the object, length, width, and height of a 3D-box, and phase relationship with position of a camera. Finally, the 3D information of the object is expressed in the form of a 3D-box in the image.

In recent years, due to rapid development of deep learning methods, researchers and engineers have been able to develop accurate and cost-effective Advanced Driving Assistance Systems (ADAS). At present, 3D object detection can be divided into 3D object detection based on lidar and 3D object detection based on a camera according to difference of sensors, wherein the 3D object detection based on a camera can be mainly divided into 3D object detection based on principle of multi-frame image parallax and 3D object detection based on a single frame image.

Since publication of the first paper on 3D detection based on lidar in 2016, 3D object detection based on lidar has been developed rapidly. In 2017, Professor Charles first proposed application of deep learning technology to 3D object detection based on a point cloud. Later, well-known enterprises, colleges and universities such as Google, Uber, The Chinese University of Hong Kong, and Shanghai Jiaotong University have carried out different researches on 3D object detection based on lidar. Due to high accuracy characteristic of point cloud data, these methods have achieved good 3D object detection accuracy. However, due to high composition of lidar, utilization rate of the methods in driving assistance is not high.

In recent years, 3D object detection methods based on the principle of multi-frame image parallax have also been developed rapidly. Many novel methods have been developed, such as that Professor Deng Zhidong of Tsinghua University and his team have optimized prediction of parallax estimation by integrating semantics, while Professor Bai Xiao of Peking University and his team have solved the problem of overfitting in parallax estimation by treating parallax estimation as a regression problem. Although multi-frame image parallax technology is becoming more and more mature, this technology does not have a cost advantage in ADAS applications due to high sensor overhead, high computational complexity and high hardware cost.

After 2018, researchers continually proposed algorithms for single frame image 3D object localization. Roddick proposed an OFT-Net network in 2018, which maps image features to an orthogonal 3D space for 3D object detection. Then in 2019, researchers continued to improve and optimize 3D object detection. However, so far, accuracy of single frame image 3D object detection is still lower than expected for driving assistance.

As driving assistance technology based on computer vision has made great progress, demand for ADAS with low power consumption and high energy efficiency in the field of driving assistance is also increasing. Existing 3D object detection algorithms based on lidar and the principle of multi-frame image parallax cannot meet requirements in terms of power consumption and cost; although 3D object detection based on a single frame has huge advantages in terms of power consumption and cost, accuracy of the existing algorithms is far from enough, and these algorithms focus more on depth estimation. For 3D object detection, prediction of horizontal information is equally important. However, the existing algorithms have not fully considered estimation of horizontal information.

SUMMARY

In view of this, the purpose of the present invention is to provide a real-time object detection and 3D localization method based on a single frame image. Recognition accuracy of an overall 3D-box is increased by constraining the prediction of horizontal information, and spatial geometric correlation of adjacent objects is introduced into a deep neural network training process in the form of a regularization term, thereby increasing speed of model training convergence and accuracy of 3D object detection and localization. At the same time, accuracy requirements of an ADAS scheme with a low hardware cost is met.

To achieve the above purpose, the present invention provides the following technical solution:

A real-time object detection and 3D localization method based on a single frame image, comprising the following steps:

S1: inputting a 2D RGB image;

S2: performing feature extraction on the 2D RGB image, and extracting features of a deep network and a shallow network respectively;

S3: carrying out 2D object detection and applying to subsequent modules;

S4: estimating vertices, instance-level depth information and center point of a 3D-box respectively;

S5: adding a regularization term for maintaining horizontal locality into prediction of the center point of the 3D-box to constrain and optimize the prediction of the center point of the 3D-box; and S6: outputting a 2D RGB image with a 3D-box tag in combination with predictions of all modules.

Optionally, in step S5, a regularization algorithm for maintaining horizontal geometric locality is used to constrain prediction of horizontal information and increase recognition accuracy of an overall 3D-box, which comprises the following steps:

S51: designing assumption for maintaining horizontal geometric locality as a regularization term in a loss function of the center point of the 3D-box, and assuming that M object samples exist in the image; matrix $S=\{s_{ij}\}$ is defined as an M×M adjacent matrix, also called a weight matrix; and an expression is shown as formula (1):

$$s_{ij}=\exp[-(u_i^{(2d)}-u_j^{(2d)})^2]/\exp[(z_i^{(3d)}-z_j^{(3d)})^2/\lambda] \quad (1)$$

wherein $s_{ij}$ represents a horizontal adjacency measure between two targets with similar depths, i,j={1, . . . , M} represents the i, $j^{th}$ target, $u_i^{(2d)}$ and $u_j^{(2d)}$ are horizontal offsets of object i and object j, and $z_i^{(3d)}$ is ground-truth depth information of object i; S52: applying similarity relationship defined by formula (1) to a fully connected layer of a neural network predicted at the center point of the 3D-box; assuming that feature information $y_i$ of a object in this layer is expressed as: $y_i=Wx_i+b$, wherein $x_i$ represents an input of the fully connected layer, W is a connection weight, and b is a deviation vector; assuming that training targets are adjacent in 3D depth and 2D horizontal directions, the whole network will try to estimate the best connection weight W so that object pairs are close to each other in 3D space; and the regularization term R(W) is defined as a feature difference of an adjacent target pair, and an expression is shown as formula (2):

$$R(W) = \frac{\beta}{2}\sum_{ij}\|Wx_i - Wx_j\|_2^2 s_{ij} \qquad (2)$$

wherein β is a custom parameter; the greater the adjacent degree of an i, j sample pair is, the greater the adjacency measure $s_{ij}$ will be, and the faster $s_{ij}$ can reduce distance between $Wx_i$ and $Wx_j$ in the process of minimizing an overall loss function so as to maintain adjacency of a object pair from a 2D space to a 3D space; R(W) is added to an overall loss function of a single frame image 3D target detection network, and a final overall loss function L of the network is expressed as:

$$L=L_{2d}+L_{depth}+L_{3d}+R(W)$$

a related loss function is defined by errors of an L1 or L2 loss function;

wherein $L_{2d}$ represents sum of a loss function of target confidence and a loss function of a 2D-box in a 2D object detection loss function;

$L_{depth}$ represents a final depth information loss function formed by that a depth information loss function uses the L1 loss function to calculate depth loss functions of a deep neural network and a shallow neural network respectively, and uses a weight r to link the two loss functions; and $L_{3d}$ represents a loss function dividing a 3D loss function into the 3D-box and the center point thereof, both of which are represented by the L1 loss function.

Optionally, in formula (1), when depth distances of two objects are similar and the objects are more adjacent on horizontal, a weight $s_{ij}$ will be greater; and when depth distance of the target pair is larger or horizontal distance difference of the object pairs is greater, the weight $s_{ij}$ will be smaller.

Optionally, the loss function of object confidence is a combination of a softmax function and a cross entropy; and the loss function of a 2D-Box is calculated by an L1 distance loss function.

Optionally, the L1 loss function is to minimize sum $S_1$ of absolute difference between a object value $Y_i$ and an estimated value $f(x_i)$:

$$S_1 = \sum_{i=1}^{n}|Y_i - f(x_i)|$$

The L2 loss function is to minimize square sum $S_2$ of difference between a target value Y, and an estimated value $f(x_i)$:

$$S_2 = \sum_{i=1}^{n}(Y_i - f(x_i))^2.$$

Optionally, the 3D-box will be represented by a 3D center point of an object and coordinate points of 8 vertices of the 3D-box.

Optionally, in step S5, the regularization term is added to a 3D object neural network, which specifically comprises the following steps:

S511: selecting a suitable neural network model and loading a weight of the model;

S512: adding a proposed regularization term for maintaining horizontal geometric locality to a loss function of a 3D-box estimation module, and setting parameters in the R(W) function;

S513: using a Stochastic Gradient Descent (SGD) algorithm with momentum to update the weight to make the model converge; and S514: loading a weight of a trained neural network into the neural network or an edge computing terminal, thus the whole network deployment is completed.

Optionally, in step S5, the regularization term for maintaining horizontal geometric locality is applied in an embedded system, which specifically comprises the following steps:

S5111: shooting a single frame image with a single camera;

S5112: transmitting the single frame image to an embedded device for analysis and computing;

S5113: performing detection and 3D localization to a plurality of objects in the image; and S5114: finally, exporting the image that have been detection and localization.

Optionally, the embedded system is Jetson AGX Xavier.

Optionally, the instance-level depth information is data obtained by predicting depth $z^g$ of the center point of the 3D-box through an instance-level depth prediction module, i.e., after a feature map is divided into grids, the depth prediction module only predicts a object depth of a grid having a distance from an instance less than a distance threshold $\sigma_{scope}$.

The present invention has the following beneficial effects:

1. First, the present invention has higher accuracy in 3D single frame object detection than the existing algorithms. When IoU=0.7, accuracy of other 3D single frame object detection algorithms in automobile category in Easy mode (where width of an object is greater than 40 pixels and the object is not occluded) is up to 20.27%, but accuracy of the present invention reaches 22.73% in the same conditions.

2. Second, a regularization method for maintaining horizontal geometric locality based on manifold learning conforms to geometric principles, and therefore can be applied to other similar methods to improve accuracy of corresponding methods.

3. Finally, thanks to simplicity of networks, detection rate of this method reaches 27.85 FPS on a server, which meets requirements for real-time performance, and can reach 7.90 FPS on an edge terminal while maintaining the same accuracy.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF DRAWINGS

To enable the purpose, the technical solution and the advantages of the present invention to be more clear, the present invention will be preferably described in detail below in combination with the drawings, wherein.

DETAILED DESCRIPTION

Figure 1:
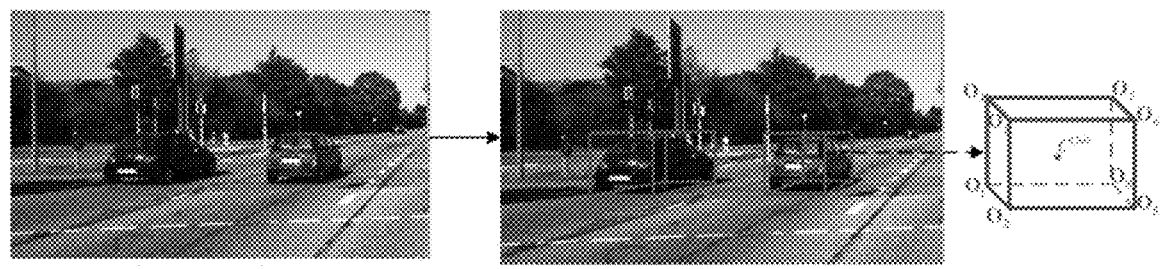
FIG. 1 is a representation of 3D object localization and a 3D-box.

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference signs in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

With reference to FIGS. 1-5, a real-time object detection and 3D localization method based on a single frame image is provided.

As shown in FIG. 1, a single frame RGB image shot with a single camera is input to predict all automobiles in the image and return 3D position information of each automobile in the form of a 3D-box, wherein the 3D-box will be represented by a 3D center point of an object and coordinate points of 8 vertices of the 3D-box. In order to replace lidar, the key to 3D object detection based on an image lies in the prediction of the center point of the 3D-box. With respect to height of a object, since height of a moving vehicle does not change much in reality, height information is not a key factor affecting accuracy. With respect to depth information, the existing algorithms have also made great progress, and reliable depth information can be obtained. Therefore, the prediction of the horizontal information of the center point of the 3D-box is very important for the prediction of the whole 3D-box.

Figure 2:
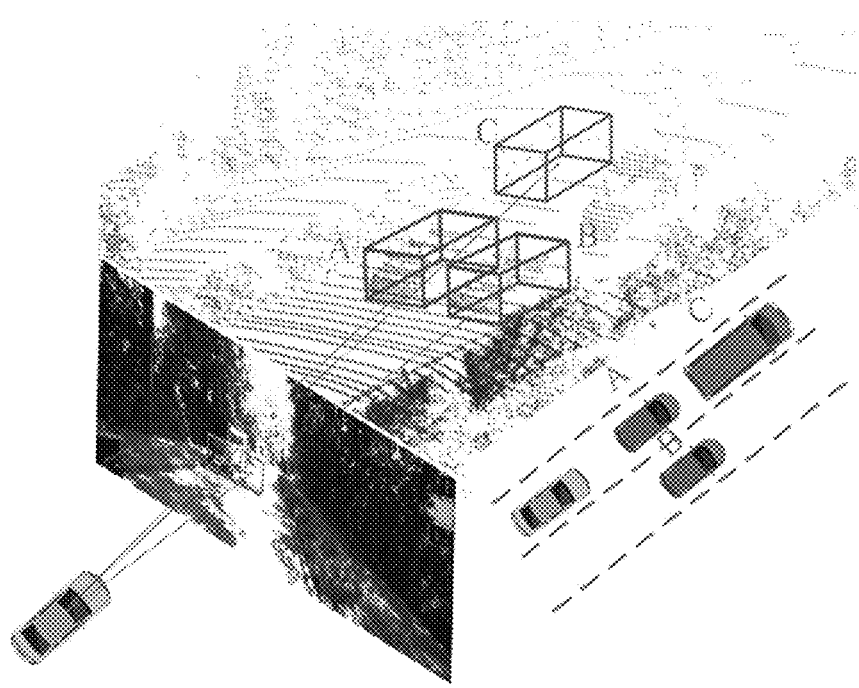
FIG. 2 is a case of 3D object localization.

As shown in FIG. 2, it can be found that distance between A and C is shorter than that between A and B on the 2D image, so it is assumed through this condition that horizontal distance between A and C in a 3D image should also be shorter. Thus, a regularization algorithm for maintaining horizontal geometric locality is used to constrain prediction of horizontal information and increase recognition accuracy of an overall 3D-box.

Principle of the regularization algorithm for maintaining horizontal geometric locality is illustrated as follows:

Assumption for maintaining horizontal geometric locality is designed as a regularization term in a loss function of the center point of the 3D-box, and a main implementation method thereof can be expressed as follows. It is assumed that M object samples exist in the image. Matrix $S=\{s_{ij}\}$ is defined as an M×M adjacent matrix, also called a weight matrix. An expression is as follows:

$$s_{ij}=\exp[-(u_i^{(2d)}-u_j^{(2d)})^2]/\exp[(z_i^{(3d)}-z_j^{(3d)})^2/\lambda] \quad (1)$$

wherein $s_{ij}$ represents a horizontal adjacency measure between two targets with similar depths, i, j={1, . . . , M} represents the i, j$^{th}$ target, $u_i^{(2d)}$ and $u_j^{(2d)}$ are horizontal pixel offsets of object i and object j, and $z_i^{(3d)}$ is the ground-truth depth information of object i. It can be seen from formula (1) that when depth distances of two objects are similar and the targets are more adjacent, a weight $s_{ij}$ will be greater; and when depth distance of the object pair is larger or horizontal distance difference of the object pair is greater, the weight $s_{ij}$ will be smaller.

Similarity relationship defined by formula (1) is applied to a fully connected layer of a neural network predicted at the center point of the 3D-box. It is assumed that feature information $y_i$ of an object in this layer can be expressed as: $y_i=Wx_i+b$, wherein $x_i$ represents an input of the fully connected layer, W is a connection weight, and b is a deviation vector. Assuming that training targets are adjacent in 3D depth and 2D horizontal directions, the whole network will try to estimate the best connection weight W so that target pairs are close to each other in 3D space. Thus, the regularization term R(W) is defined as a feature difference of an adjacent target pair, and an expression is shown as formula (2).

$$R(W) = \frac{\beta}{2}\sum_{ij}\|Wx_i - Wx_j\|_2^2 s_{ij} \quad (2)$$

wherein β is a custom parameter. The greater the adjacent degree of an i, j sample pair is, the greater the adjacency measure $s_{ij}$ will be, and the faster $s_{ij}$ can reduce distance between $Wx_i$ and $Wx_j$ in the process of minimizing an overall loss function so as to maintain adjacency of a target object from a 2D space to a 3D space. Finally, R(W) is added to an overall loss function of a single frame image 3D target detection network, and a final overall loss function L of the network is expressed as:

$$L = L_{2d} + L_{depth} + L_{3d} + R(W)$$

A related loss function can be defined by common L1 or L2 errors.

The L1 loss function is to minimize sum S of absolute difference between a target value $Y_i$ and an estimated value $f(x_i)$:

$$S_1 = \sum_{i=1}^{n} |Y_i - f(x_i)|$$

The L2 loss function is to minimize square sum $S_2$ of difference between a target value $Y_i$ and an estimated value $f(x_i)$:

$$S_2 = \sum_{i=1}^{n} (Y_i - f(x_i))^2.$$

$L_{2d}$: mainly sum of a loss function of target confidence and a loss function of a 2D-box in a 2D object detection loss function, wherein the loss function of target confidence is mainly a combination of a softmax function and a cross entropy, and the loss function of a 2D-Box is mainly calculated by an L1 distance loss function.

$L_{depth}$ a final depth information loss function formed by that a depth information loss function uses the L1 loss function to calculate depth loss functions of a deep neural network and a shallow neural network respectively, and uses a weight r to link the two loss functions.

$L_{3d}$: a loss function dividing a 3D loss function into the 3D-box and the center point thereof, both of which are represented by the L1 loss function.

Compared with existing single frame 3D object detection algorithms, the present invention improves accuracy of the center point of the 3D-box in horizontal direction on the original basis, and therefore improves accuracy of 3D object detection, and maintains requirements for real-time performance in ADAS application scenarios. Table 1 shows experimental results of different methods on a KITTI data set.

TABLE 1

Comparison of Experimental Results of 3D Object Detection with Different Methods

| Method | Year | AP3D(IoU = 0.5) | | | AP3D(IoU = 0.7) | | | FPS |
| --- | --- | --- | --- | --- | --- | --- | --- | --- |
| | | Easy | Moderate | Hard | Easy | Moderate | Hard | |
| 3DOP(Chen et al., 2017a) | 2017 | 46.04 | 34.63 | 30.09 | 6.55 | 5.07 | 4.10 | 0.23 |
| Mono3D(Chen et al., 2016) | 2016 | 25.19 | 18.20 | 15.22 | 2.53 | 2.31 | 2.31 | 0.33 |
| OFT-Net(Roddick et al., 2018) | 2018 | — | — | — | 4.07 | 3.27 | 3.29 | — |
| FQNet(Liu et al., 2019) | 2019 | 28.16 | 21.02 | 19.91 | 5.98 | 5.50 | 4.75 | 2.00 |
| ROI-10D(Manhardt et al., 2019) | 2019 | — | — | — | 10.25 | 6.39 | 6.18 | — |
| MF3D(Novak, 2017) | 2018 | 47.88 | 29.48 | 26.44 | 10.53 | 5.69 | 5.39 | 8.33 |
| MonoDIS(Simonelli et al., 2019) | 2019 | — | — | — | 11.06 | 7.60 | 6.37 | — |
| MonoPSR(Ku et al., 2019) | 2019 | 49.65 | 41.71 | 29.95 | 12.75 | 11.48 | 8.59 | 5.00 |
| ShiftNet(Naiden et al., 2019) | 2019 | — | — | — | 13.84 | 11.29 | 11.08 | — |
| MonoGRNet(Qin et al., 2019) | 2019 | 50.51 | 36.97 | 30.82 | 13.88 | 10.19 | 7.62 | 25.00 |
| GS3D(Li et al., 2019) | 2019 | 30.60 | 26.40 | 22.89 | 11.63 | 10.51 | 10.51 | 0.43 |
| SS3D(Jörgensen et al., 2019) | 2019 | — | — | — | 14.52 | 13.15 | 11.85 | 20.00 |
| M3D-RPN(Brazil & Liu, 2019) | 2019 | — | — | — | 20.27 | 17.06 | 15.21 | — |
| Oucs | — | 55.64 ± 0.45 | 34.10 ± 0.14 | 34.10 ± 0.07 | 22.73 ± 0.30 | 16.73 ± 0.27 | 15.55 ± 0.24 | 27.85 |

1. First, the present invention has higher accuracy in 3D single frame object detection than the existing algorithms. When IoU=0.7, accuracy of other 3D single frame object detection algorithms in automobile category in Easy mode (where width of an object is greater than 40 pixels and the object is not occluded) is up to 20.27%, but accuracy of the present invention reaches 22.73% in the same conditions.

2. Second, a regularization method for maintaining horizontal geometric locality based on manifold learning conforms to geometric principles, and therefore can be applied to other similar methods to improve accuracy of corresponding methods.

3. Finally, thanks to simplicity of networks, detection rate of this method reaches 27.85 FPS on a server, which meets requirements for real-time performance, and can reach 7.90 FPS on an edge terminal while maintaining the same accuracy.

Figure 3:
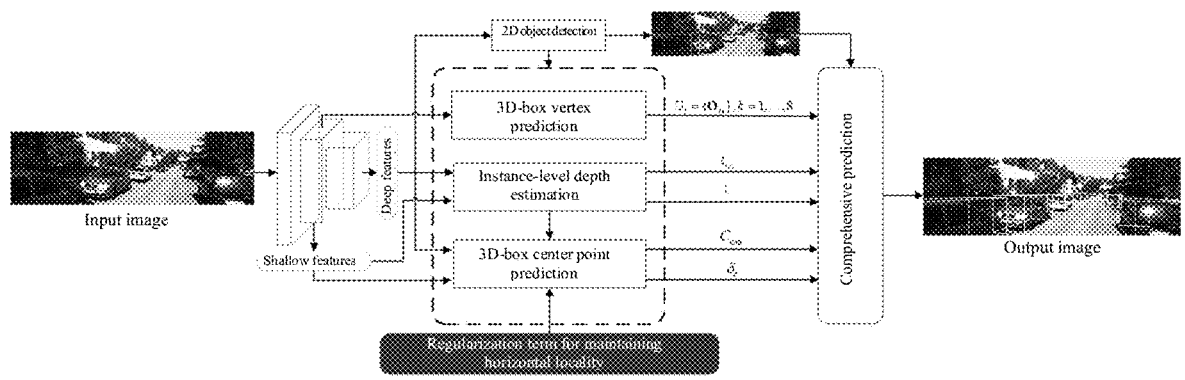
FIG. 3 is a flow chart of a single frame 3D object detection algorithm.
Figure 4:
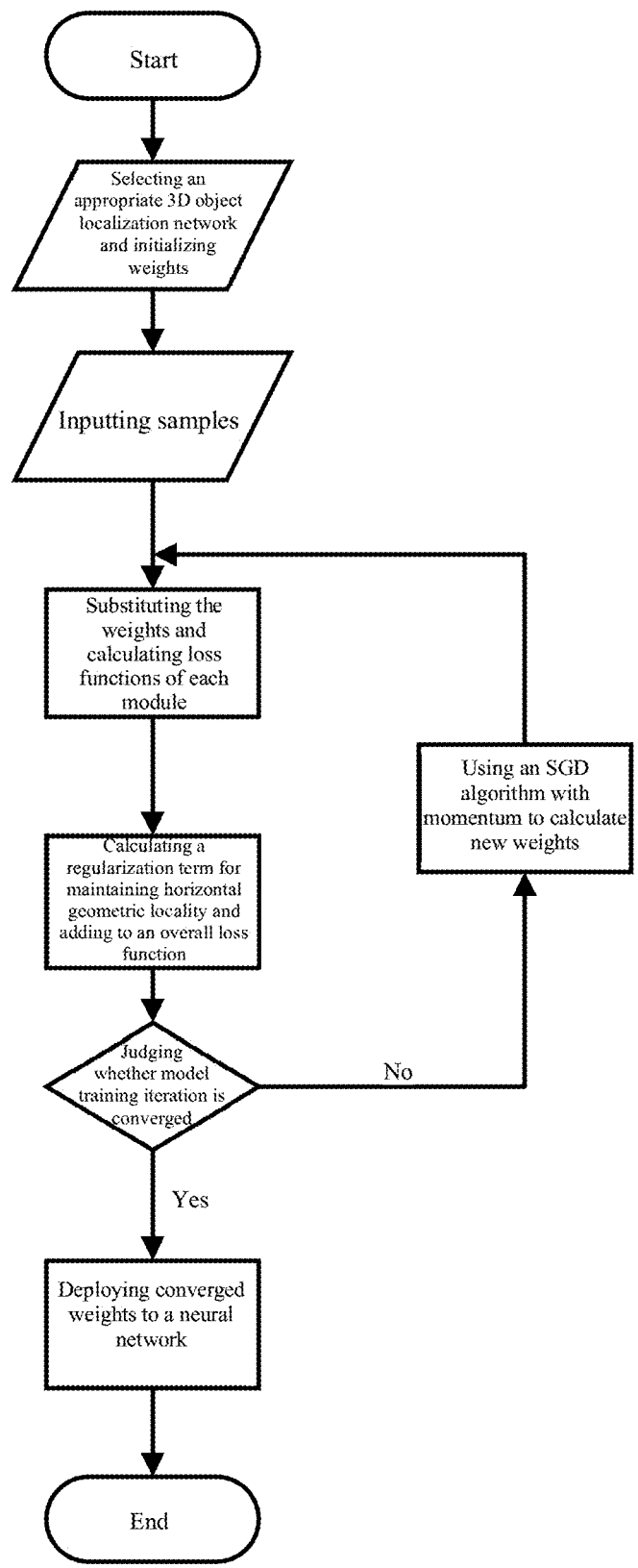
FIG. 4 is a flow chart of a single frame 3D object detection network.

FIG. 3 is a flow chart of a single frame 3D object detection method. Briefly, the flow chart can be expressed as the following steps.

1. Inputting a single frame 2D RGB image.
2. Performing feature extraction on the 2D RGB image, and extracting features of a deep network and a shallow network respectively.
3. Carrying out 2D object detection and applying to subsequent modules.
4. Estimating vertices, instance-level depth information and center point of a 3D-box respectively.
5. Adding a regularization term for maintaining horizontal locality into prediction of the center point of the 3D-box to constrain and optimize the prediction of the center point of the 3D-box.
6. Outputting a 2D RGB image with a 3D-box tag in combination with predictions of all modules. The instance-level depth information is data obtained by predicting depth $z^g$ of the center point of the 3D-box through an instance-level depth prediction module, i.e., after a feature map is divided into grids, the depth prediction module only predicts a target depth of a grid having a distance from an instance less than a distance threshold $\sigma_{scope}$.

Moreover, the regularization term can be added to most 3D object neural networks. Specifically, the following steps are required. Please refer to the flow chart in FIG. 4 for details.

Step 1: selecting a suitable neural network model and loading a weight of the model.

Step 2: adding a proposed regularization term for maintaining horizontal geometric locality to a loss function of a 3D-box estimation module, and setting parameters in the R(W) function.

Step 3: using an SGD algorithm with momentum to update the weight to make the model converge.

Step 4: loading a weight of a trained neural network into the neural network or an edge computing terminal. Thus, the whole network deployment is completed.

Figure 5:
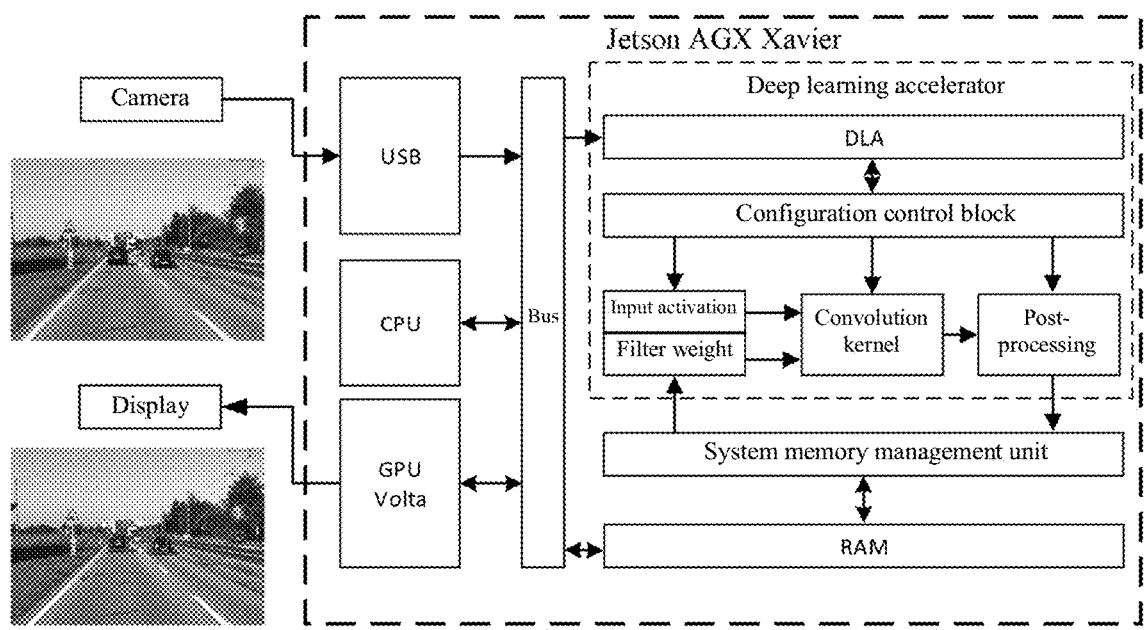
FIG. 5 is a block diagram of a single frame 3D object detection embedded system.

As shown in FIG. 5, the regularization method for maintaining horizontal geometric locality can be applied in an embedded system. A single frame image is shot with a single camera, the single frame image is transmitted to an embedded device for analysis and computing, detection and 3D localization is performed to a plurality of objects in the image, and finally, the image that have been detected and localized is exported. In this system, the embedded system is Jetson AGX Xavier, an embedded edge computing device launched by NVIDIA at the end of 2018. The detection rate of this method on Xavier reaches 7.90 FPS. The regularization method for maintaining horizontal geometric locality can not only be applied to a single frame image, but also be adopted to increase recognition accuracy when a multi-frame image and radar point cloud data are used.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. A real-time object detection and 3D localization method based on a single frame image, comprising the following steps:

S1: inputting a 2D infrared image;

S2: performing feature extraction on the 2D infrared image, and extracting features of a deep network and a shallow network respectively;

S3: carrying out 2D object detection and applying to subsequent modules;

S4: estimating vertices, instance-level depth information and center point of a 3D-box respectively;

S5: adding a regularization term for maintaining horizontal locality into prediction of the center point of the 3D-box to constrain and optimize the prediction of the center point of the 3D-box; and S6: outputting a 2D infrared image with a 3D-box tag in combination with predictions of all modules.

2. The real-time object detection and 3D localization method based on a single frame image according to claim 1, wherein in step S5, a regularization algorithm for maintaining horizontal geometric locality on the image is used to constrain prediction of 3D horizontal information and increase detection accuracy of an overall 3D-box, which comprises the following steps:

S51: designing assumption for maintaining horizontal geometric locality as a regularization term in a loss function of the center point of the 3D-box, and assuming that M target samples exist in the image; a matrix $S=\{s_{ij}\}$ is defined as an M×M adjacent matrix as formula (1):

$$s_{ij}=\exp[-(u_i^{(2d)}-u_j^{(2d)})^2]/\exp[(z_i^{(3d)}-z_j^{(3d)})^2/\lambda] \quad (1)$$

wherein $s_{ij}$ represents a horizontal adjacency measure between two targets with similar depths, $u_i^{(2d)}$ and $u_j^{(2d)}$ are horizontal pixel offsets of object i and object j, and $z_i^{(3d)}$ is the ground-truth depth information of object i;

S52: applying the regularization term to a fully connected layer of a neural network predicted at the center point of the 3D-box; assuming the output of object i in this layer is $y_i=Wx_i+b$, wherein $x_i$ represents an input of the fully connected layer, W is a connection weight, and b is the deviation vector; assuming that training targets are adjacent in 3D depth and 2D horizontal directions, the whole network will try to estimate the best connection weight W so that target pairs are close to each other in 3D space; and the regularization term R(W) is defined as a feature difference of an adjacent target pair, and an expression is shown as formula (2):

$$R(W) = \frac{\beta}{2}\sum_{ij}\|Wx_i - Wx_j\|_2^2 s_{ij} \quad (2)$$

wherein $\beta$ is a balance coefficient; the greater the adjacent degree of an i,j sample pair is, the greater the adjacency measure $s_{ij}$ will be, and the faster $s_{ij}$ can reduce distance between $Wx_i$ and $Wx_j$ in the process of minimizing an overall loss function so as to maintain adjacency of target pairs from 2D space to 3D space; R(W) is added to an overall loss function of a single frame image 3D target detection network, and a final overall loss function L of the network is expressed as:

$$L=L_{2d}+L_{depth}+L_{3d}+R(W)$$

a related loss function is defined by errors of an L1 or L2 loss function;

wherein $L_{2d}$ represents sum of a loss function of target confidence and a loss function of a 2D-box in a 2D object detection loss function;

$L_{depth}$ represents a final depth information loss function formed by that a depth information loss function uses the L1 loss function to calculate depth loss functions of a deep neural network and a shallow neural network respectively, and uses a weight W to link the two loss functions;

$L_{3d}$ represents a loss function dividing a 3D loss function into the 3D-box and the center point thereof, both of which are represented by the L1 loss function.

3. The real-time object detection and 3D localization method based on a single frame image according to claim 2, wherein in formula (1), when depth distances of two targets are similar and the targets are more adjacent on horizontal, a weight su will be greater; and when depth distance of the target pair is larger or horizontal distance difference of the target pairs is greater, the weight $s_{ij}$ will be smaller.

4. The real-time object detection and 3D localization method based on a single frame image according to claim 2, wherein the loss function of target confidence is a combination of a softmax function and a cross entropy; and the loss function of a 2D-Box is calculated by an L1 distance loss function.

5. The real-time object detection and 3D localization method based on a single frame image according to claim 2, wherein the L1 loss function is to minimize sum S of absolute difference between a target value $Y_i$ and an estimated value $f(x_i)$:

$$S_1 = \sum_{i=1}^{n} |Y_i - f(x_i)|$$

the L2 loss function is to minimize square sum $S_2$ of difference between a target value $Y_i$ and an estimated value $Y_i$:

$$S_2 = \sum_{i=1}^{n} (Y_i - f(x_i))^2.$$

6. The real-time object detection and 3D localization method based on a single frame image according to claim 1, wherein the 3D-box will be represented by a 3D center point of an object and coordinate points of 8 vertices of the 3D-box.

7. The real-time object detection and 3D localization method based on a single frame image according to claim 1, wherein in step S5, the regularization term is added to a neural network, which specifically comprises the following steps:

S511: selecting a suitable neural network model and loading a weight of the model;

S512: adding a proposed regularization term for maintaining horizontal geometric locality to a loss function of a 3D-box estimation module, and setting parameters in the R(W) function;

S513: using a Stochastic Gradient Descent (SGD) algorithm with momentum to update the weight to make the model converge; and S514: loading a weight of a trained neural network into the neural network or an edge computing terminal, thus the whole network deployment is completed.

8. The real-time target detection and 3D positioning method based on a single frame image according to claim 7, wherein in step S5, the regularization term for maintaining horizontal geometric locality is applied in an embedded system, which specifically comprises the following steps:

S5111: shooting a single frame image with a single camera;

S5112: transmitting the single frame image to an embedded device for analysis and computing;

S5113: performing recognition and 3D positioning to a plurality of targets in the image; and S5114: finally, exporting the image that have been recognized and positioned.

9. The real-time target detection and 3D positioning method based on a single frame image according to claim 8, wherein the embedded system is Jetson AGX Xavier.

10. The real-time target detection and 3D positioning method based on a single frame image according to claim 1, wherein the instance-level depth information is data obtained by predicting depth $z^g$ of the center point of the 3D-box through an instance-level depth prediction module, i.e., after a feature map is divided into grids, the depth prediction module only predicts a target depth of a grid having a distance from an instance less than a distance threshold $\sigma_{scope}$.

* * * * *